(12) United States Patent
Takizawa

(10) Patent No.: US 8,356,521 B2
(45) Date of Patent: Jan. 22, 2013

(54) PRESSURE SENSOR DEVICE

(75) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 523 days.

(21) Appl. No.: 12/606,494

(22) Filed: Oct. 27, 2009

(65) Prior Publication Data

US 2010/0107772 A1     May 6, 2010

(30) Foreign Application Priority Data

Oct. 31, 2008    (JP) ................................. 2008-280959

(51) Int. Cl.
*G01L 9/08*     (2006.01)
(52) U.S. Cl. .......................................................... 73/723
(58) Field of Classification Search ................... 73/754, 73/716, 723, 725, 726, 727
See application file for complete search history.

(56) References Cited

U.S. PATENT DOCUMENTS

| | | | | |
|---|---|---|---|---|
| 3,486,046 | A | * | 12/1969 | Zalar ............................... 310/324 |
| 4,193,010 | A | * | 3/1980 | Kompanek ....................... 310/330 |
| 4,445,384 | A | * | 5/1984 | Royer .............................. 73/724 |
| 5,663,505 | A | * | 9/1997 | Nakamura ....................... 73/702 |
| 7,181,972 | B2 | * | 2/2007 | Dasgupta et al. ................ 73/705 |
| 2002/0117012 | A1 | * | 8/2002 | Lec ............................ 73/862.338 |
| 2005/0200236 | A1 | * | 9/2005 | Buhler et al. ................... 310/317 |
| 2007/0074566 | A1 | * | 4/2007 | Roundy et al. .................. 73/146 |
| 2008/0134792 | A1 | * | 6/2008 | Lee et al. ........................ 73/645 |
| 2009/0146230 | A1 | | 6/2009 | Takizawa | |

FOREIGN PATENT DOCUMENTS

| | | |
|---|---|---|
| EP | 0 496 890 | 8/1992 |
| JP | 04-095742 | 3/1992 |
| JP | 07-027643 | 1/1995 |
| JP | 2007-108161 | 4/2007 |
| JP | 2008252509 A | * 10/2008 |
| JP | 2009-139339 | 6/2009 |
| WO | 2008-036701 | 3/2008 |

* cited by examiner

*Primary Examiner* — Lisa Caputo
*Assistant Examiner* — Punam Roy
(74) *Attorney, Agent, or Firm* — Harness, Dickey & Pierce, P.L.C.

(57) ABSTRACT

A pressure sensor device includes a substrate having a first section and a second section being adjacent to the first section and thinner than the first section, a piezoelectric film having flexibility and disposed on the second section, an upper electrode formed on the piezoelectric film and including a center electrode disposed at a substantially center of the second section in plan view, and a peripheral electrode disposed apart from the center electrode so as to surround the center electrode, a lower electrode formed between the second section and the piezoelectric film and disposed so as to face the upper electrode, and a detection circuit including a differential circuit electrically connected to the center electrode and the peripheral electrode, and the detection circuit detects a difference between a voltage caused between the center electrode and the lower electrode in response to the piezoelectric film being distorted, and a voltage caused between the peripheral electrode and the lower electrode in response to the piezoelectric film being distorted.

8 Claims, 13 Drawing Sheets

NEGATIVE DIRECTION
WITH RESPECT TO Z-AXIS

PRESSURE SENSOR DEVICE

BACKGROUND

1. Technical Field

The present invention relates to a pressure sensor device.

2. Related Art

In recent years, integration between Micro Electro Mechanical System (MEMS) and IC has been progressed in the silicon industry, and various types of complex semiconductor devices have been developed. As examples of such devices, in particular, acceleration sensors, gyro sensors, resonators as timing devices, and so on have been developed energetically. Further, there are still a lot of problems remaining in fusion and integration between MEMS devices and Complementary Metal Oxide Semiconductor (CMOS), and various engineering developments are in progress.

In the past, as a pressure sensor for detecting pressure, there have been generally used a capacitance type pressure sensor, a piezoresistive sensor, a piezoelectric sensor, and so on, and in particular, those called a piezoresistive sensor have become mainstream (see e.g., JP-A-7-27643).

Here, as a pressure sensor 100 shown in FIG. 15A for example, since the capacitance type pressure sensor is provided with a configuration in which a diaphragm 101 with a certain gap is disposed so as to move in accordance with a pressure difference, and the capacitance variation thereof is detected, the power consumption required for operation thereof is small. Therefore, the capacitance type pressure sensor is particularly used for applications requiring low power consumption. However, since such a capacitance type pressure sensor has low sensitivity, in order for achieving the sensitivity higher than a certain level, the diaphragm 101 needs to have a large area, and at the same time, the structure needs to become complicated. Therefore, if it is attempted to apply the capacitance type pressure sensor 100 shown in FIG. 15A in the MEMS field, for example, there arises a problem that it is difficult to integrally form the capacitance type pressure sensor and a CMOS circuit or the like, for detecting the pressure applied to the pressure sensor, with each other.

Further, as pressure sensors 110, 120 shown, for example, in FIGS. 15B and 15C, the piezoresistive pressure sensor has a structure in which bridge resistors 112 disposed on semiconductor thin films 111, 121 are distorted in response to the pressure applied thereto, and the variation in resistance on this occasion is converted into a voltage and then detected, and has high sensitivity. Further, in the case of application to the MEMS field described above, it is possible to easily integrate the pressure sensor and the CMOS circuit or the like with each other. However, in such piezoresistive pressure sensors 110, 120, since it is required to continuously supply the bridge resistors 112 with a constant current flow, there arises a problem that it is not suitable for applications requiring low power consumption. In particular, since it is required to add another constant current circuit in order for reliably improving the operational accuracy in a high temperature range, there is a problem of incurring a further increase in current consumption.

Further, the piezoelectric pressure sensor has a structure in which a piezoelectric film, which is disposed on a diaphragm formed of a silicon substrate formed to be a thin film, is distorted in response to the pressure applied thereto, and the voltage variation on this occasion is detected, and has low power consumption. Further, in the case of application to the MEMS field described above, it is possible to easily integrate the pressure sensor and the CMOS circuit or the like with each other. However, the piezoelectric pressure sensor in the related art has low sensitivity in pressure detection, and has a problem that it is difficult to use the piezoelectric pressure sensor for applications requiring detection of a particularly small pressure variation.

Therefore, a pressure sensor (a pressure sensor device), which can easily be formed integrally with a semiconductor circuit such as a CMOS circuit, which has low power consumption, and which is superior in pressure detection sensitivity, is desired.

SUMMARY

The invention intends to solve at least part of the above problems and can be realized by the following aspects of the invention.

According to a first aspect of the invention, there is provided a pressure sensor device including a substrate having a first section and a second section being adjacent to the first section and thinner than the first section, a piezoelectric film having flexibility and disposed on the second section, an upper electrode formed on the piezoelectric film and including a center electrode disposed at a substantially center of the second section in plan view, and a peripheral electrode disposed apart from the center electrode so as to surround the center electrode, a lower electrode formed between the second section and the piezoelectric film and disposed so as to face the upper electrode, and a detection circuit including a differential circuit electrically connected to the center electrode and the peripheral electrode, wherein the detection circuit detects a difference between a voltage caused between the center electrode and the lower electrode in response to the piezoelectric film being distorted, and a voltage caused between the peripheral electrode and the lower electrode in response to the piezoelectric film being distorted.

According to this aspect of the invention, the change in electric field caused inside the piezoelectric film in response to the piezoelectric film being distorted by the pressure applied to the piezoelectric film can be obtained as an amplified signal of the difference in voltage by the detection circuit (the differential amplifier circuit) for detecting the respective changes in voltages inside the piezoelectric film based on a plurality of piezoelectric capacitances, namely the piezoelectric capacitance between the center electrode and the lower electrode and the piezoelectric capacitance between the peripheral electrode and the lower electrode. Therefore, it is possible to subtract the unnecessary noise included in the change in voltage caused by the distortion of the piezoelectric film and the noise such as the variation of the power supply voltage to balance them out, thus the pressure applied to the piezoelectric film can be detected with high sensitivity without being affected by such noises.

In the pressure sensor device of the above aspect of the invention, it is preferable that a polarity of a charge generated in each of the center electrode and the peripheral electrode in response to the piezoelectric film being distorted is different between the center electrode and the peripheral electrode.

According to the sensor device, even in the case in which only minute changes occur in voltages inside the piezoelectric film based on the piezoelectric capacitance between the center electrode and the lower electrode and the piezoelectric capacitance between the peripheral electrode and the lower electrode due to the distortion of the piezoelectric film in response to the pressure applied to the piezoelectric film, since the polarity of the charge generated is different between the center electrode and the peripheral electrode, it is possible to increase the differential output voltage. Further, by connecting the differential output electrode composed of the center electrode and the peripheral electrode to the detection circuit having the differential circuit, the pressure sensor device, which has high detection sensitivity, which is not affected by the noises similarly to the case described above, and which is highly sensitive, can be realized.

In the pressure sensor device of the above aspect of the invention, it is preferable that one of the center electrode and the peripheral electrode is disposed in an area where an electric flux density caused in response to the piezoelectric film being distorted is negative, and the other of the center electrode and the peripheral electrode is disposed in an area where an electric flux density caused in response to the piezoelectric film being distorted is positive.

According to the sensor device, even in the case in which only minute changes occur in voltages inside the piezoelectric film based on the piezoelectric capacitance between the center electrode and the lower electrode and the piezoelectric capacitance between the peripheral electrode and the lower electrode due to the distortion of the piezoelectric film in response to the pressure applied to the piezoelectric film, since one of the center electrode and the peripheral electrode is disposed in the area where the electric flux density is negative, and the other of the center electrode and the peripheral electrode is disposed in the area where the electric flux density is positive, the polarity of the charge generated is different between the center electrode and the peripheral electrode, and thus the differential output voltage can be increased. Further, by connecting the differential output electrode composed of the center electrode and the peripheral electrode to the detection circuit having the differential circuit, the pressure sensor device, which has high detection sensitivity, which is not affected by the noises similarly to the case described above, and which is highly sensitive, can be realized.

In the pressure sensor device of the above aspect of the invention, it is preferable that a reference voltage is applied to the lower electrode.

According to the sensor device, since the voltage level input to the detector such as the differential amplifier circuit can be controlled using the reference voltage $V_{ref}$, the performance (such as a gain) of the detector can be set to be the optimum value. Therefore, the change in voltage inside the piezoelectric film can be detected, and in particular, with high sensitivity.

In the pressure sensor device of the above aspect of the invention, it is preferable that the piezoelectric film and the peripheral electrode are disposed so as to straddle a boundary between the first section and the second section.

According to the sensor device, since a larger amount of charge is generated at the boundary (boundary between the thick portion and the thin portion) in the periphery of the diaphragm where the compressive stress and the tensile stress are concentrated inside the piezoelectric film in response to the piezoelectric film being distorted due to the pressure applied to the piezoelectric film, the pressure applied to the piezoelectric film can efficiently be detected.

In the pressure sensor device of the above aspect of the invention, it is preferable that the substrate is made of a semiconductor material.

According to the sensor device, the detection circuit formed of a semiconductor material can be formed on the substrate, and thus the second section (the sensing area) and the detection circuit can be integrated with each other.

In the pressure sensor device of the above aspect of the invention, it is preferable that the substrate and the detection circuit are provided to the same semiconductor substrate.

According to the sensor device, the detection circuit can be formed on the first section in the same semiconductor substrate, and thus, the integrated pressure sensor device having the second section formed as the sensing area can be provided.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

In the following description of the embodiment, a pressure sensor device is cited as an example, and explanations therefor will be presented.

Embodiment

Figure 1:
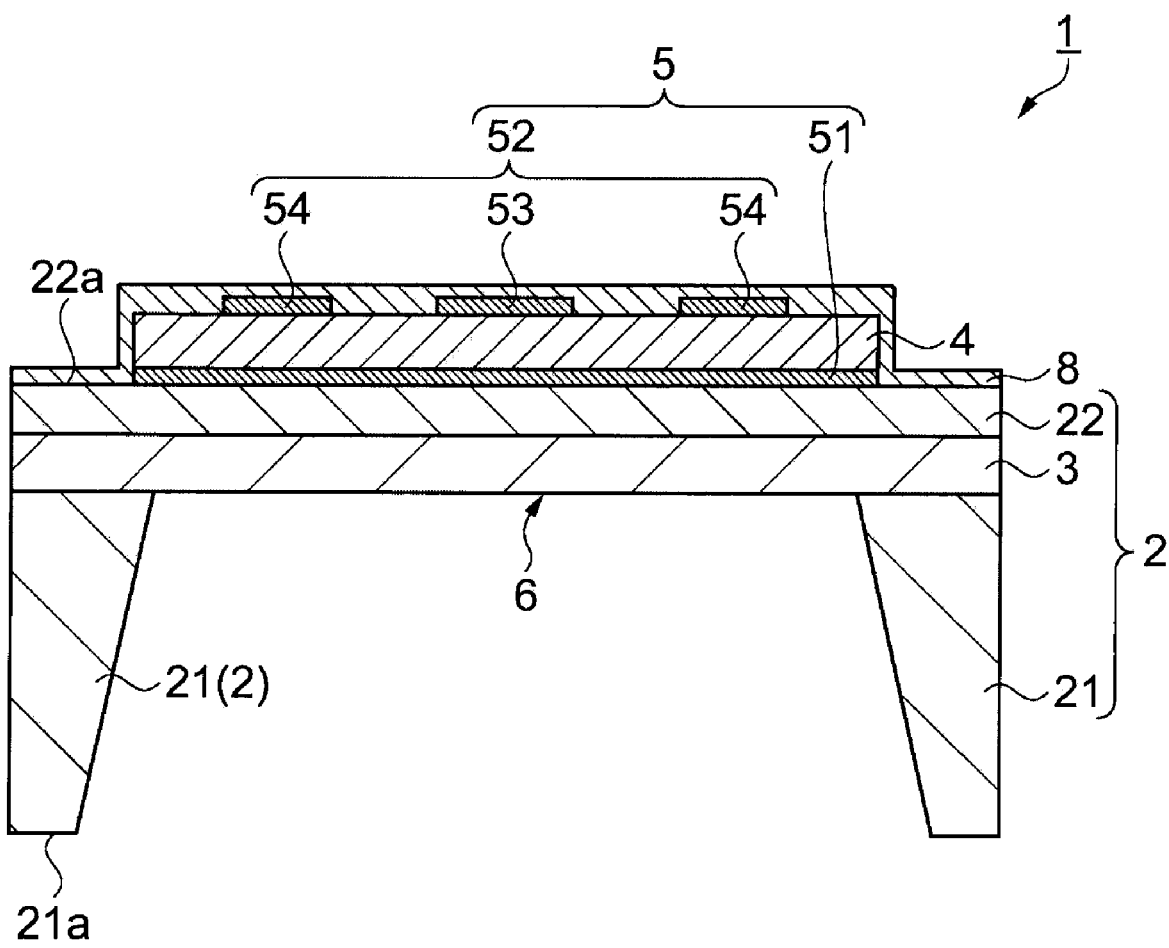
FIG. 1 is a schematic cross-sectional view showing an example of a pressure sensor device according to the present embodiment.
Figure 2A:
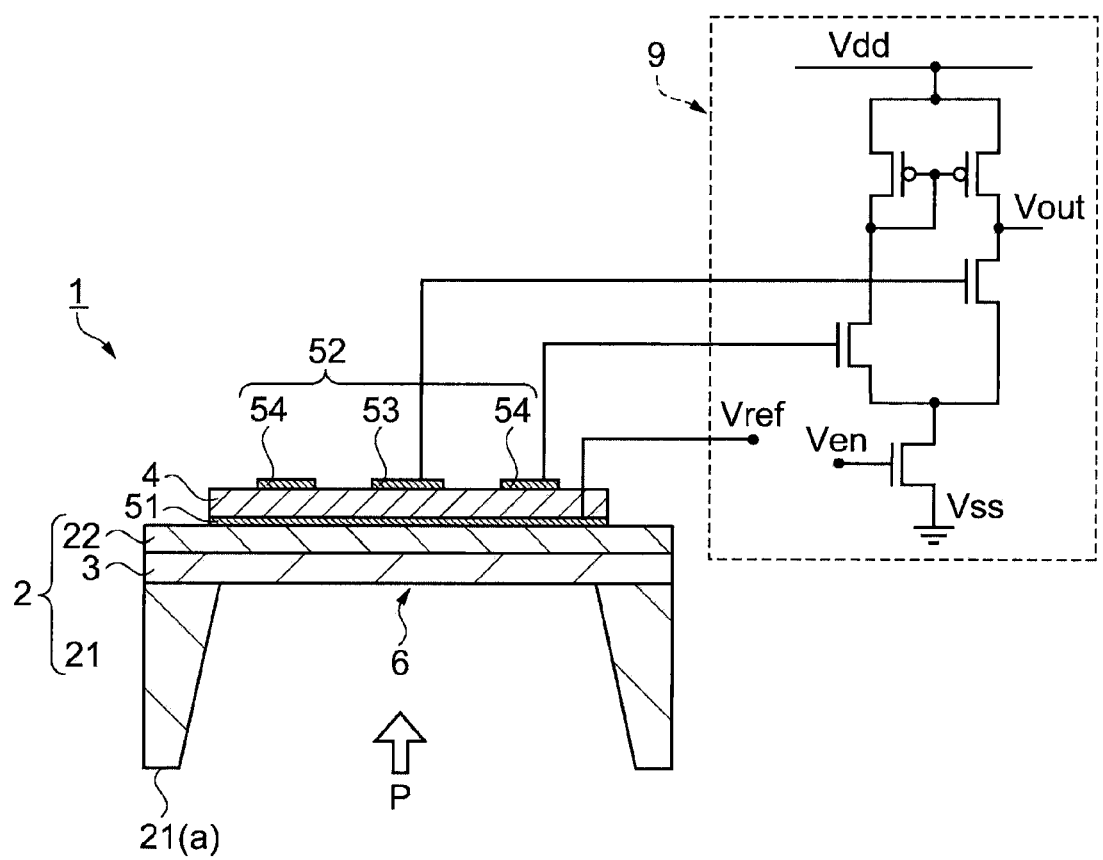
FIGS. 2A and 2B are schematic diagrams showing an example of a semiconductor circuit (a differential amplifier circuit) for detecting the pressure applied to the pressure sensor device.
Figure 2B:
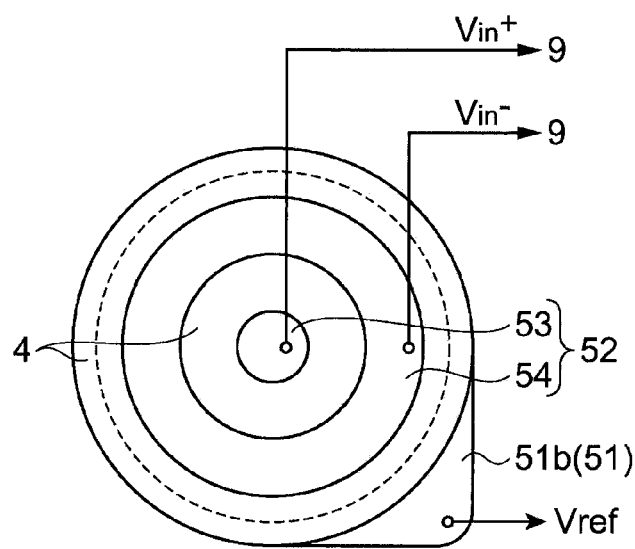
Figure 3:
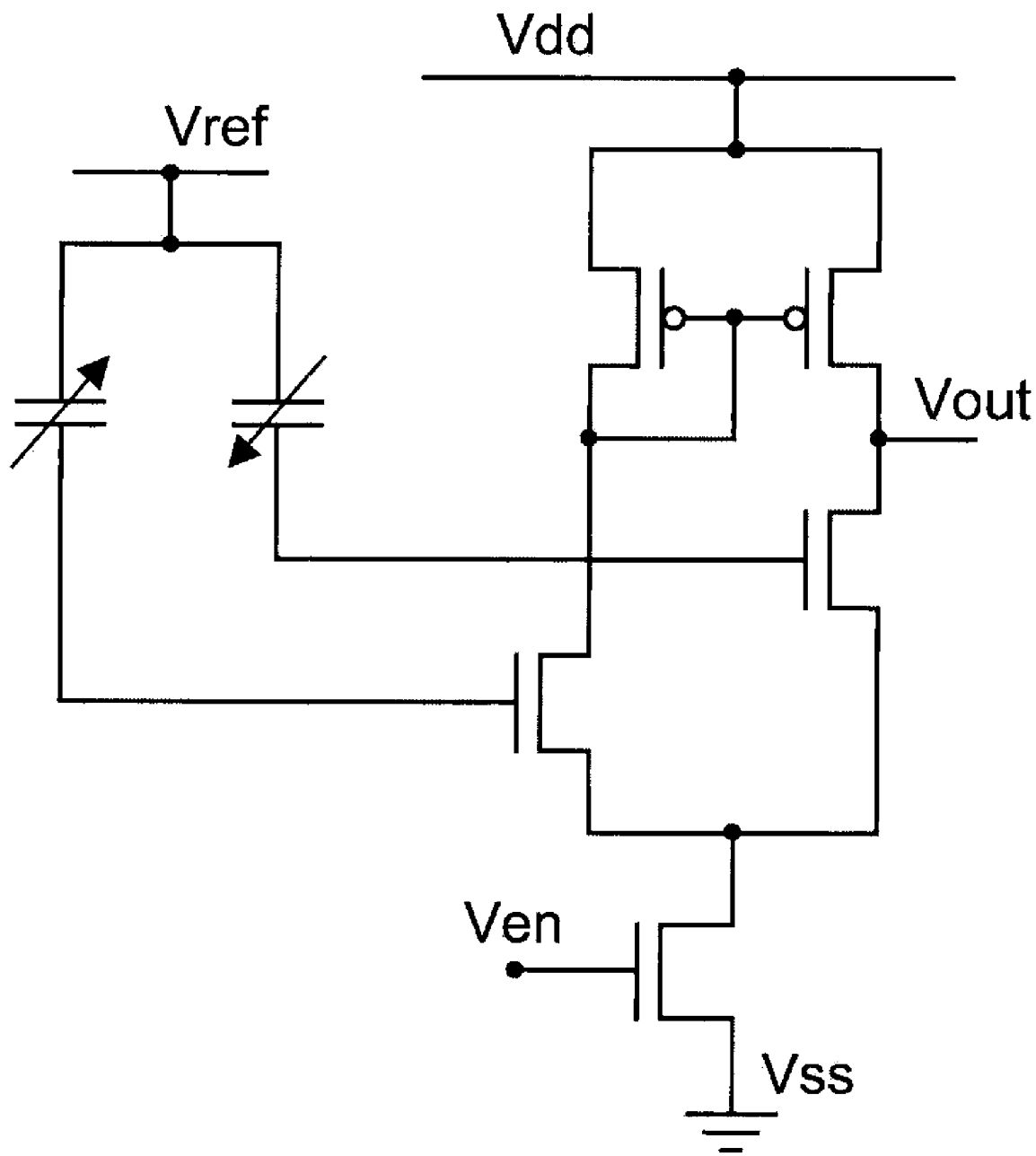
FIG. 3 is a schematic diagram showing an equivalent circuit in the case in which the pressure sensor device and the semiconductor device are connected to each other.
Figure 4A:
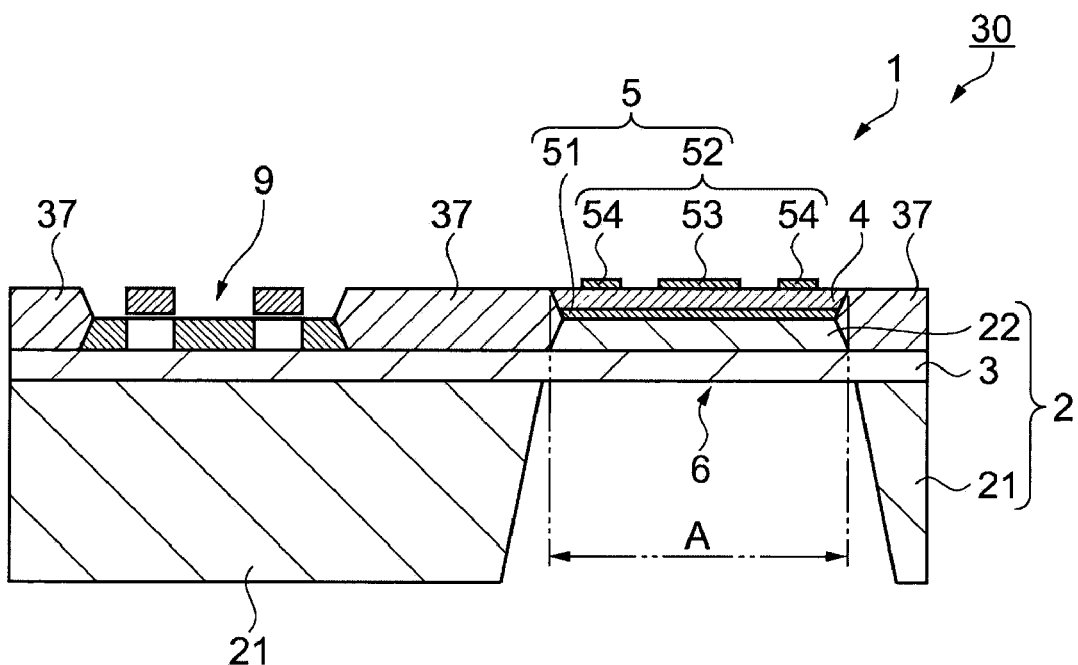
FIGS. 4A and 4B are schematic cross-sectional views showing the pressure sensor device according to the present embodiment.
Figure 4B:
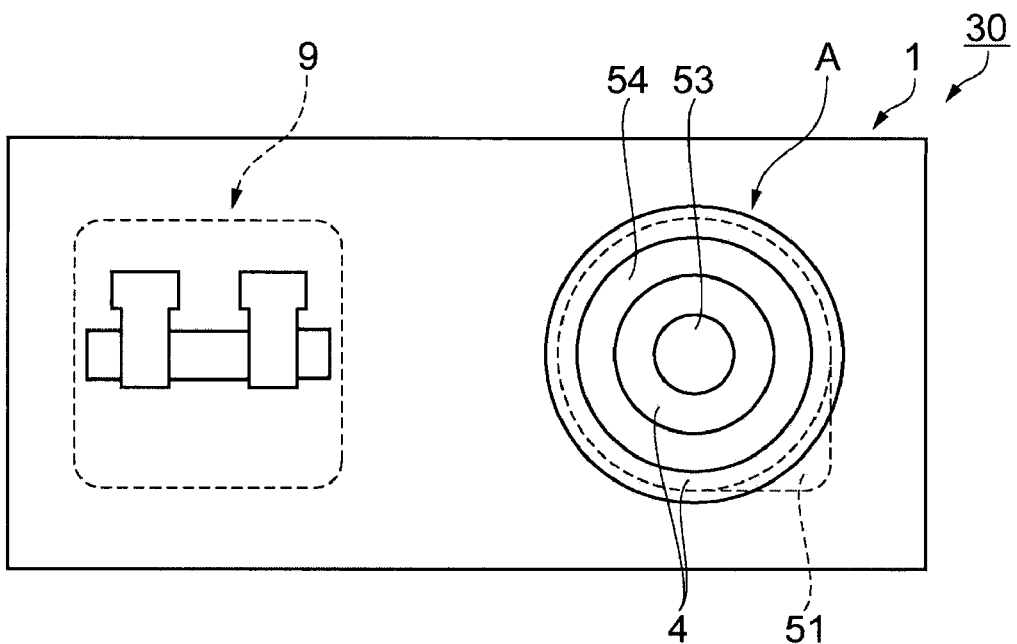
Figure 5:
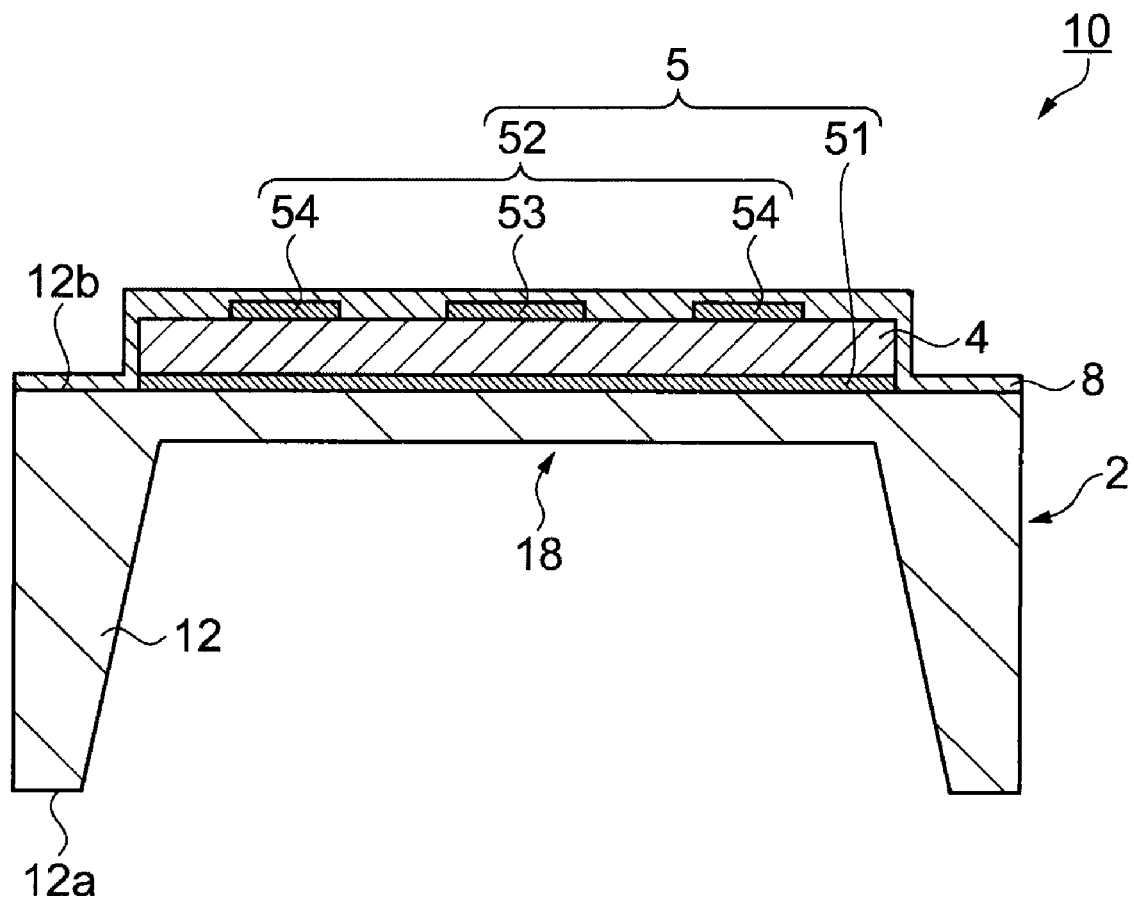
FIG. 5 is a schematic cross-sectional view showing another example of the pressure sensor device.

FIG. 1 is a schematic cross-sectional view showing an example of the pressure sensor device according to the present embodiment. FIGS. 2A and 2B are schematic diagrams showing an example of a semiconductor circuit (a differential amplifier circuit) for detecting the pressure applied to the pressure sensor device. FIG. 3 is a schematic diagram showing an equivalent circuit in the case in which the pressure sensor device and the semiconductor device are connected to each other. FIGS. 4A and 4B are schematic cross-sectional views showing the pressure sensor device according to the present embodiment. FIG. 5 is a schematic cross-sectional view showing another example of the pressure sensor device.

As shown in FIG. 1, the pressure sensor device 1 is provided with a first substrate 21, a buried oxide film 3 (a buried insulating film), a second substrate 22, a piezoelectric film 4, an electrode 5, and a covering layer 8.

The buried oxide film 3 is stacked on the first substrate 21, and the second substrate 22 is formed so as to be stacked on the buried oxide film 3. Further, the piezoelectric film 4 and the electrode 5 are formed so as to be stacked on the second substrate 22. At least a part of an area of the first substrate 21 corresponding to an area on the second where the piezoelectric film 4 and the electrode 5 are disposed is removed, thereby forming a sensing area A (see FIGS. 4A and 4B). In other words, a substrate 2 provided with a first section and a second section being adjacent to the first section and thinner than the first section is composed of the first substrate 21, the buried oxide film 3, and the second substrate 22. The electrode 5 is composed of a lower electrode 51 formed between the second substrate 22 and the piezoelectric film 4 on the second substrate 22, and upper electrode 52 formed on the piezoelectric film 4. The lower electrode 51 and the upper electrode 52 are disposed across the piezoelectric film 4 from each other. The upper electrode 52 is composed of at least two parts, which form a center electrode 53 and a peripheral electrode 54, respectively in the embodiment. Further, the covering layer 8 is formed so as to cover the second substrate 22, the piezoelectric film 4, and the electrode 5.

The first substrate 21 and the second substrate 22 are each a semiconductor support substrate made of single-crystal silicon. The second substrate 22 is formed so as to be stacked on the buried oxide film 3 stacked on the first substrate 21, thereby forming the substrate 2 having a so-called Silicon On Insulator (SOI) structure. Further, the first substrate 21 and the second substrate 22 can have a configuration formed of a semiconductor material equivalent to silicon. Further, the thickness of the first substrate 21 is set to be about 300 μm, and the thickness of the second substrate 22 is set to be in a range of 1 μm through 40 μm. The thickness of the buried oxide film 3 is set to be in a range of 1 μm through 5 μm.

On the surface 22a of the second substrate 22, there are stacked in sequence the lower electrode 51, the piezoelectric film 4, and the upper electrode 52. Further, an almost entire part of the first substrate 21 corresponding to the area on the second substrate 22 where the piezoelectric film 4 and the lower electrode 51 are disposed is removed by Deep Reactive Ion Etching (Deep RIE), and the buried oxide film 3 is exposed from the reverse surface 21a of the first substrate 21. Thus, the buried oxide film 3 and the second substrate 22 existing in the part (the second section) corresponding to the removed part of the first substrate 21 are used as the diaphragm 6.

It should be noted that as the substrate 2, besides those made of a semiconductor material, a piezoelectric substrate such as a quartz crystal substrate can be used. Further, the substrate 2 is not necessarily required to have the layered structure, but can be a substrate formed of a piezoelectric substrate such as a quartz crystal substrate provided with the first section and the second section being adjacent to the first section and thinner than the first section formed by etching the center section thereof.

The buried oxide film 3 can be formed of a know material such as a silicon oxide film, a silicon nitride film, or a semiconductor oxide film equivalent thereto, and can be formed on the first substrate 21 using a thermal oxidation method, a Chemical Vapor Deposition (CVD) method, and so on. Here, in the case of using the CVD method, the second substrate 22 is formed of a polysilicon film.

Since the pressure sensor device 1 is provided with the substrate 2 having the SOI structure, as described above, when removing the part of the first substrate 21 by the Deep RIE, the buried oxide film 3 acts as an etching stopper. Thus, it becomes possible to improve the control of the thickness of the diaphragm 6 formed as a thin film composed of the second substrate 22 and the buried oxide film 3 corresponding to the part of the first substrate 21 removed by etching.

The piezoelectric film 4, which has flexibility and varies in charge amount in accordance with the distortion caused by the pressure applied thereto when detecting the pressure using the pressure sensor device 1, is stacked on the lower electrode 51 formed on the surface 22a of the second substrate 22. Further, the piezoelectric film 4 is formed to have a substantially circular shape.

As the material of the piezoelectric film 4, any known piezoelectric material having the piezoelectric function can be used without any restrictions, and among them, those with the hexagonal wurtzite crystal structure made of III-V group or III-VI group element apt to be aligned along the c-axis can preferably be used. For example, aluminum nitride (AlN) or zinc oxide (ZnO) having the wurtzite crystal structure, or lead zirconate titanate (PZT) having the perovskite structure is preferably used. Further, a piezoelectric material such as lithium tetraborate ($Li_2B_4O_7$) or lithium niobate ($LiNbO_3$) can also be used. In the present embodiment, aluminum nitride (AlN) is deposited using a reactive sputtering method, thereby forming the piezoelectric film 4 having desired orientation and piezoelectric constant. Here, the reactive sputtering method is a deposition method in which a reduced-pressure atmosphere state is provided in the chamber of the sputtering equipment, the flow ratio between the Ar gas and the $N_2$ gas is set to be 1:1 in the chamber, and the plasma is discharged to the target of pure Al. Further, in the case of forming the piezoelectric film 4 by depositing zinc oxide (ZnO) instead of aluminum nitride (AlN), it is also possible to form the piezoelectric film 4 having desired orientation and piezoelectric constant by using the target of pure Zn and supplying $O_2$ gas instead of $N_2$ gas in the chamber.

The electrode 5 is an electrode for detecting the voltage variation caused in the piezoelectric film 4. Further, as described above, the electrode 5 is composed of the lower electrode 51, the upper electrode 52, and the upper electrode 52 is composed of the center electrode 53 and the peripheral electrode 54.

As shown in FIG. 2A, the lower electrode 51 is formed between the second substrate 22 and the piezoelectric film 4 of the substrate 2, and disposed so as to face the upper electrode 52.

As shown in FIG. 2B, the lower electrode 51 is formed to have a substantially circular shape similarly to the piezoelectric film 4. Further, the lower electrode 51 is provided with a terminal section 51b running off the outer circumference of the piezoelectric film 4 having the substantially circular shape so as to be exposed therefrom. Further, the upper electrode 52 has a configuration including the center electrode 53 disposed at substantially the center of the surface of the piezoelectric film 4 and formed to have a substantially circular shape, and the peripheral electrode 54 disposed apart from the center electrode 53 and formed to have a ring-like shape so as to surround the center electrode 53.

Regarding the materials of the electrode 5, platinum (Pt) is used as the lower electrode 51, and aluminum (Al) is used as the upper electrode 52 (i.e., the center electrode 53 and the peripheral electrode 54). Here, as the materials of the electrode 5, besides platinum (Pt) and aluminum (Al), any electrode materials made of known metals can also be used. A film of metal with FCC structure such as gold (Au) or nickel (Ni), a film of metal with BCC structure such as molybdenum (Mo), chromium (Cr), or tungsten (W), a film of metal with Hexa structure such as zirconium (Zr), cobalt (Co), or titanium (Ti), a titanium nitride (TiN) film, or a ruthenium (Ru) film can preferably be used. Although it is assumed that the lower electrode 51 is formed on the surface 22a of the second substrate 22 made of single-crystal silicon, the invention is not limited thereto, but it is also possible that a metal layer made, for example, of titanium (Ti) or molybdenum (Mo) is deposited on the surface 22a of the second substrate 22 in order for improving the adhesiveness between the lower electrode 51 and the second substrate 22, and the lower electrode 51 is formed on the metal layer.

Regarding the lower electrode 51, Pt is deposited by sputtering using the target of pure Pt. Then, patterning of the lower electrode 51 is performed by a photolithographic method using a resist, thereby removing Pt deposited thereon and exposed from the resist for patterning by etching. Thus, the lower electrode 51 made of Pt is formed. Here, as the method of etching Pt, a wet etching method using aqua regia (mixed acid obtained by mixing hydrochloric acid and nitric acid at a ratio of 3:1), a dry etching method using a mixed gas of HBr and $Cl_2$, and so on are used.

Further, the patterning of the piezoelectric film 4 is performed by a wet etching method using an alkali solution (tetramethylammonium hydroxide solution at a concentration of 1% through 25%) after forming AlN on the entire surface of the substrate by the reactive sputtering method described above, and then providing the resist patterning by a photographic method.

Regarding the upper electrode 52, Al is deposited by sputtering using the target of pure Al in a similar manner as described above. Then, in a similar manner as described above, the upper electrode 52 made of Al are formed by patterning and then etching. Here, the sputtering is substantially the same as the reactive sputtering method in forming the piezoelectric film 4 described above, but is different therefrom in that the $N_2$ gas is not used.

Therefore, it is possible to form the piezoelectric film 4 and the upper electrode 52 continuously in the same chamber. Specifically, after forming the piezoelectric film 4 made of AlN, by stopping supplying N2 while continuously supplying Ar, the upper electrode 52 made of Al is formed. It should be noted that in this case etching of the upper electrode 52 and the piezoelectric film 4 also needs to be performed continuously. Further, although the example in which AlN is used as the material of the piezoelectric film 4, pure Al is used as the material of the upper electrode 52, and the piezoelectric film 4 and the upper electrode 52 are deposited using the reactive sputtering method is explained, the invention is not limited thereto. For example, it is also possible that zinc is used as the target, an Ar gas and an $O_2$ gas are supplied in the chamber, and supply of the $O_2$ gas is selectively stopped, thereby forming the piezoelectric film 4 made of ZnO and the upper electrode 52 made of Zn continuously. Further, the combination of the materials of the piezoelectric film 4 and the upper electrode 52 is not limited to the combinations described above, but can appropriately be selected.

As described above, the pressure sensor device 1 has a configuration in which the upper electrode 52 is composed of the center electrode 53 and the peripheral electrode 54. Therefore, the piezoelectric capacitance obtained by the piezoelectric film 4 between the lower electrode 51 and the center electrode 53 and the piezoelectric capacitance obtained by the piezoelectric film 4 between the lower electrode 51 and the peripheral electrode 54 are different from each other. Thus, the pressure sensor device 1 becomes to have two different piezoelectric capacitances.

Further, as shown in FIGS. 2A and 2B, the lower electrode 51 and the upper electrode 52 (the center electrode 53 and the peripheral electrode 54) are electrically connected to the detection circuit 9 as the semiconductor circuit (the differential amplifier circuit) for detecting the pressure applied to the pressure sensor device 1. Thus, as shown in the equivalent circuit of FIG. 3, there is formed a state in which the two circuits respectively generating the piezoelectric capacitances different from each other are connected in parallel to each other. When the pressure is applied to the piezoelectric film 4 in the condition in which a constant voltage is applied to the piezoelectric film 4, a change is caused in the electric field inside the piezoelectric film 4. On this occasion, by detecting the change in the voltage inside the piezoelectric film 4 based on each of the two different piezoelectric capacitances between the lower electrode 51 and the center electrode 53 and between the lower electrode 51 and the peripheral electrode 54, and obtaining the difference between the changes in the voltages, a minute voltage variation inside the piezoelectric film 4 can be detected.

When performing the pressure detection using the pressure sensor device 1, it is possible to use the detection circuit 9 (the differential amplifier circuit) mainly composed of the current mirror circuit and the differential circuit shown in FIG. 2A, for example. This detection circuit 9 has a configuration in which two circuits each having a pMOS element and an nMOS element connected in series to each other are provided, and the two circuits are disposed symmetrically. One of the two circuits is connected to the output terminal $V_{out}$ at a node between the pMOS element and the nMOS element. The pMOS element is connected to a drain power supply voltage $V_{dd}$. The center electrode 53 and the peripheral electrode 54 are connected to the gate electrodes of the respective nMOS elements. The lower electrode 51 is connected to a reference voltage $V_{ref}$. The nMOS elements are connected to a source power supply voltage Vss via an intermittent actuating switch $V_{en}$. Thus, the difference between the changes in the voltages inside the piezoelectric film 4 based on the two different piezoelectric capacitances between the lower electrode 51 and the center electrode 53 and between the lower electrode 51 and the peripheral electrode 54 is obtained. Further, since the noise from the power supply can be eliminated by subtracting the common mode noise therefrom, it becomes possible to detect the pressure with high sensitivity. Then, the voltage value obtained as the difference between the changes in the voltages is output from the $V_{out}$ as the pressure detection signal.

As described above, the covering layer 8 is a protective cover film provided so as to cover the second substrate 22, the piezoelectric film 4, and the electrode 5. The cover layer 8 can be formed from, for example, silicon oxide or silicon nitride using a CVD method.

In the manner as described above, a semiconductor device 30 (see FIGS. 4A and 4B) obtained by connecting the detection circuit 9 to the lower electrode 51 and the upper electrode 52 of the pressure sensor device 1 is provided. The explanation of the semiconductor device 30 is omitted here, and will be presented after the principle of the pressure detection has been explained below.

Hereinafter, the principle applied when performing pressure detection using the pressure sensor device 1 and the detection circuit 9 (the differential amplifier circuit) will be explained in detail.

Firstly, when the pressure is applied to the diaphragm 6 from the side of the reverse surface 21a of the first substrate 21 in the condition in which the center electrode 53 and the peripheral electrode 54 are connected to the respective input terminals of the detection circuit (differential amplifier circuit) 9 and the lower electrode 51 is connected to the reference voltage $V_{ref}$. On this occasion, in the inside of the piezoelectric film 4, the internal electric field varies in accordance with the pressure applied thereto, and the change in voltage is caused inside the piezoelectric film 4. Here, since the stress caused in the piezoelectric film 4 between the lower electrode 51 and the center electrode 53 and the stress caused in the piezoelectric film 4 between the lower electrode 51 and the peripheral electrode 54 are different from each other, the charge corresponding to the stress is generated respectively, and the changes in the respective voltages are caused. These voltages are input to the nMOS of the detection circuit 9, respectively. The detection circuit 9 outputs the voltage value obtained as the difference between the changes in the voltages from the $V_{out}$ as the pressure detection signal.

Here, as described above, since the pressure sensor device 1 according to the present embodiment is provided with the lower electrode 51, the center electrode 53, and the peripheral electrode 54, and is configured to have different piezoelectric capacitances in the piezoelectric film 4 between the lower electrode 51 and the center electrode 53 and between the lower electrode 51 and the peripheral electrode 54, it becomes possible to detect changes in the voltages inside the piezoelectric film 4 based on the two different piezoelectric capacitances from the inside of the piezoelectric film 4, thereby detecting the pressure with high sensitivity.

Here, although the pressure sensor device 1 shown in FIGS. 1, 2A, and 2B has the upper electrode 52 that formed on the piezoelectric film 4 and composed of a pair of center electrode 53 and peripheral electrode 54, the invention is not limited thereto. For example, it is also possible to adopt the configuration in which a plurality of peripheral electrodes 54 is provided so as to surround the center electrode 53.

Further, the pressure sensor device 1 according to the present embodiment is not limited to having the configuration using the substrate 2 having the SOI structure shown in FIG. 1. For example, as a pressure sensor device 10 in an example shown in FIG. 5, it is also possible to adopt the configuration in which the piezoelectric film 4 and the electrodes are formed on a substrate 12 formed of a single layer of silicon. Further, it is also possible to adopt the configuration in which the buried oxide film 3 is formed on the substrate 12 formed of the single layer of silicon, and piezoelectric film 4 and the electrodes are formed on the buried oxide film 3.

Hereinafter, the piezoelectric film 4 having two or more different piezoelectric capacitances inside thereof will be explained.

As described above, the pressure sensor device 1 according to the present embodiment is provided with the lower electrode 51 disposed on the lower side of the piezoelectric film 4 and the upper electrode 52 that is composed of a plurality of parts and is disposed on the upper side of the piezoelectric film 4, and is configured to have the configuration of substantially having two or more piezoelectric capacitances inside the piezoelectric film 4, thereby making it possible to perform highly sensitive pressure detection. Hereinafter, the principle thereof will be explained in detail with reference to FIGS. 6A, 6B, 7 through 9, 10A, 10B, and 11 through 14. FIGS. 6A, 6B, 7 through 9, 10A, 10B, and 11 through 14 are schematic diagrams for explaining relationships between the piezoelectric film 4, the lower electrode 51, and the upper electrode 52 provided to the pressure sensor device according to the present embodiment and a plurality of piezoelectric capacitances obtained by these elements.

Figure 6A:
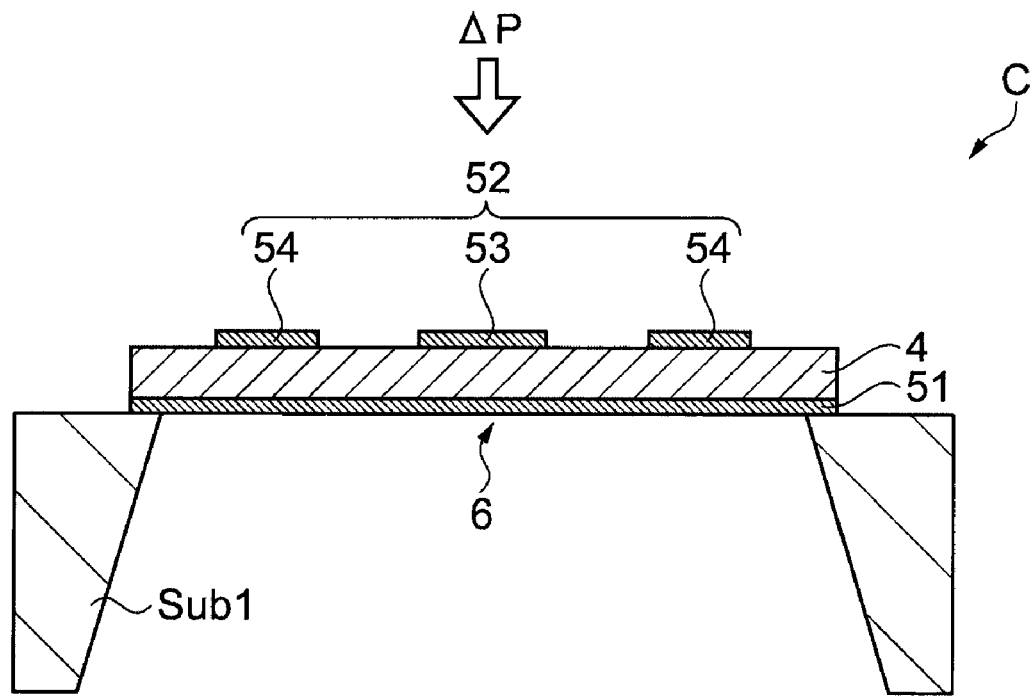
FIGS. 6A and 6B are schematic diagrams for explaining relationships with a plurality of piezoelectric capacitances obtained by the pressure sensor device according to the present embodiment.
Figure 6B:
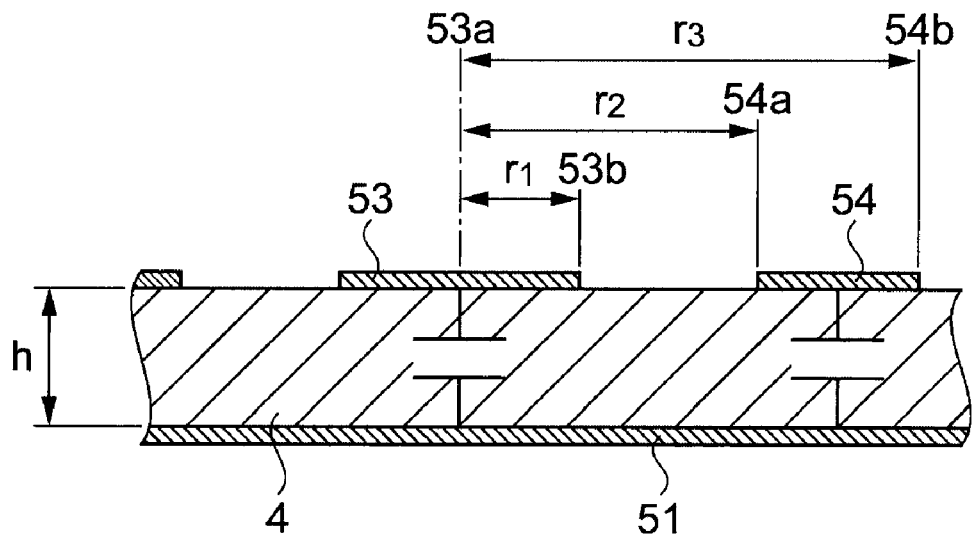
Figure 7:
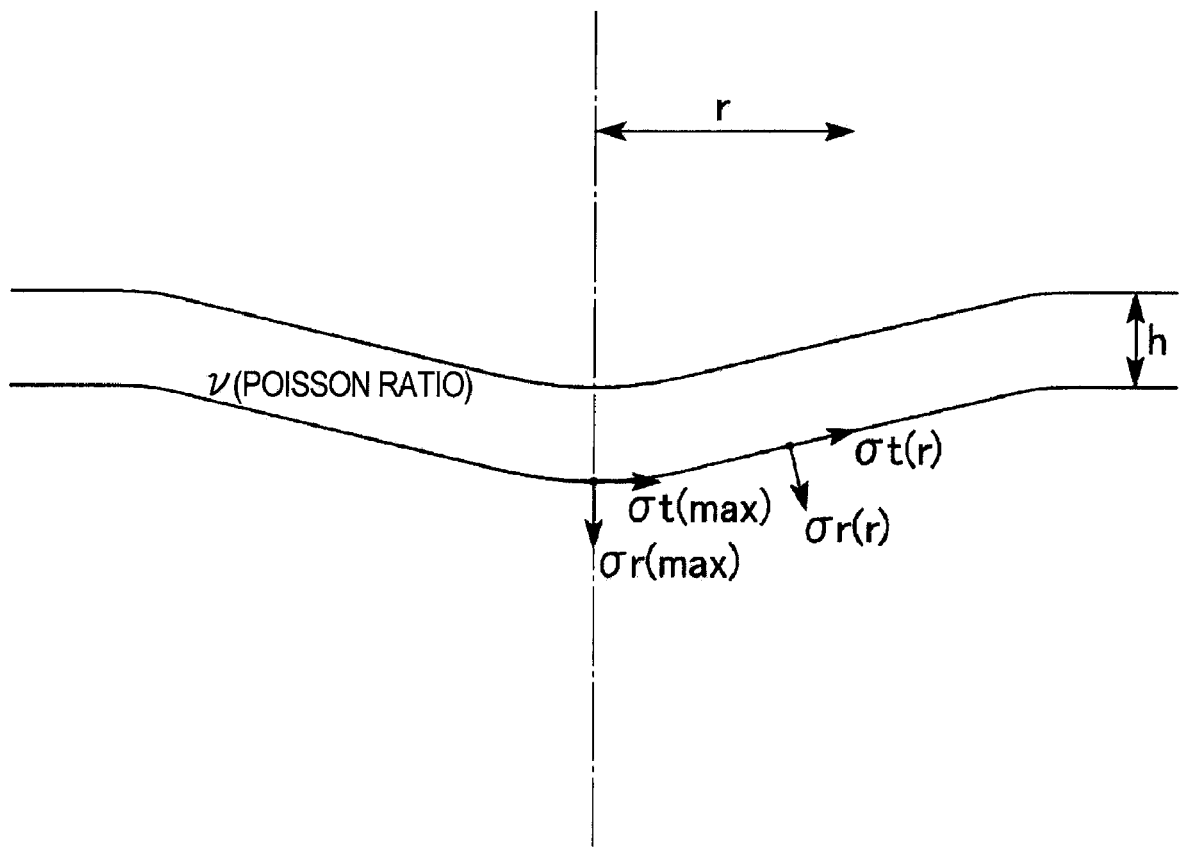
FIG. 7 is a schematic diagram for explaining relationships with a plurality of piezoelectric capacitances obtained by the pressure sensor device according to the present embodiment.

As shown in FIGS. 6A and 6B, here the lower electrode 51 is disposed on a substrate Sub1, from which a sensing area A having a circular shape is removed by etching, so as to cover the sensing area A, and the piezoelectric film 4 is stacked on the lower electrode 51. Further, the upper electrode 52 is formed on the piezoelectric film 4. The upper electrode 52 will be explained exemplifying a pressure sensor device C having the center electrode 53 disposed at the center position of the piezoelectric film 4, and the peripheral electrode 54 formed to have a ring-like shape disposed so as to surround the center electrode 53.

The distance between the center 53a of the center electrode 53 and the outer circumference 53b thereof is denoted as $r_1$, the distance between the center 53a of the center electrode 53 and the inner circumference 54a of the peripheral electrode 54 is denoted as $r_2$, and the distance between the center 53a of the center electrode 53 and the outer circumference 54b of the peripheral electrode 54 is denoted as $r_3$.

In the pressure sensor device C shown in FIGS. 6A and 6B, the layered body composed mainly of the lower electrode 51, the piezoelectric film 4, the center electrode 53, and the peripheral electrode 54 forms the circular diaphragm 6. When differential pressure (gauge pressure) ΔP is applied to such a diaphragm 6, the stress generated on the lower surface of the diaphragm 6 is illustrated as the form shown in FIG. 7, and at the same time, analytically obtained by the general expressions 1, 2, and 3 described below (reference: "The MEMS Handbook" Mohamed Gad-el-Hak, CRC Press, pp. 25-2).

Expression 1

$$\sigma_r = \sigma_o \left[ (1+v) - \frac{r^2}{a^2}(3+v) \right] \quad (1)$$

Expession 2

$$\sigma_t = \sigma_o \left[ (1+v) - \frac{r^2}{a^2}(1+3v) \right] \quad (2)$$

Expression 3

$$\sigma_o \frac{3\Delta P}{8h^2} \cdot a^2 \quad (3)$$

Here, in the general expressions 1 through 3, the symbol h denotes the thickness of the piezoelectric film 4, the symbol a denotes the radius of the diaphragm 6, the symbol v denotes the Poisson ratio, the symbols $\phi_r$, $\phi_t$ respectively denote the stress in the normal direction and the stress in the tangential direction at the position with a distance r outward from the center of the diaphragm, and the same is applied to the following general expressions.

Here, $\phi_r(r)$, $\phi_t(r)$ vary between "tensile" and "compressive" in accordance with the distance r from the center thereof. Further, the relationships between the Poisson ratio v and the stress $f_r$, $f_t$ on this occasion are expressed by the general expressions 4, 5, 6, and 7.

Expression 4

$$f_r = [(1+v) - \tilde{r}^2(3+v)] \quad (4)$$

Expression 5

$$f_t = [(1+v) - \tilde{r}^2(1+3v)] \quad (5)$$

Expression 6

$$\tilde{r} = \frac{r}{a} \quad (6)$$

Expression 7

$$0 \leq \tilde{r} \leq 1 \quad (7)$$

In the general expressions 4, 5, 6, and 7, the Poisson ratio v is typically in a range greater than −1 and smaller than 0.5.

Figure 8:
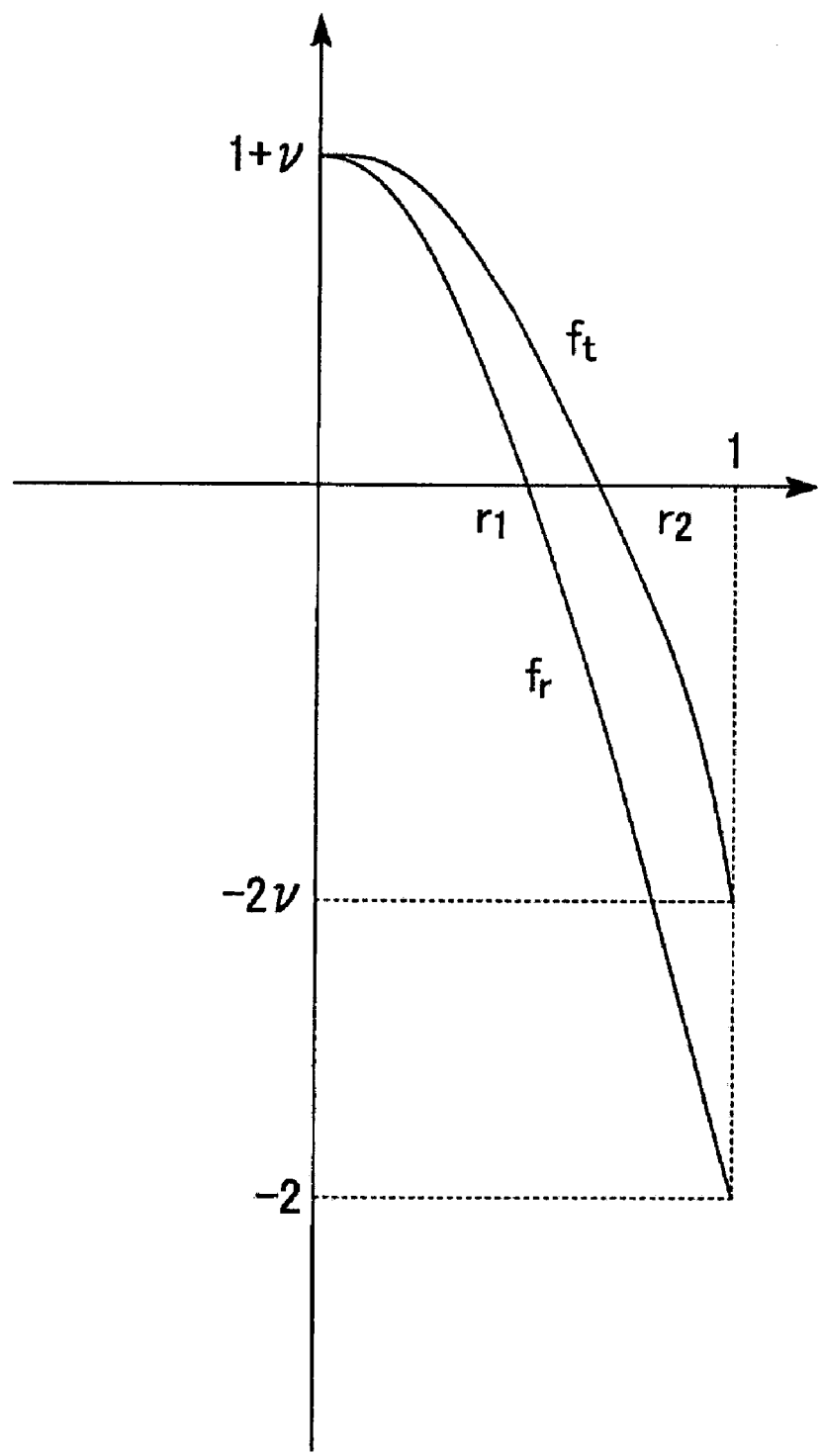
FIG. 8 is a schematic diagram for explaining relationships with a plurality of piezoelectric capacitances obtained by the pressure sensor device according to the present embodiment.
Figure 9:
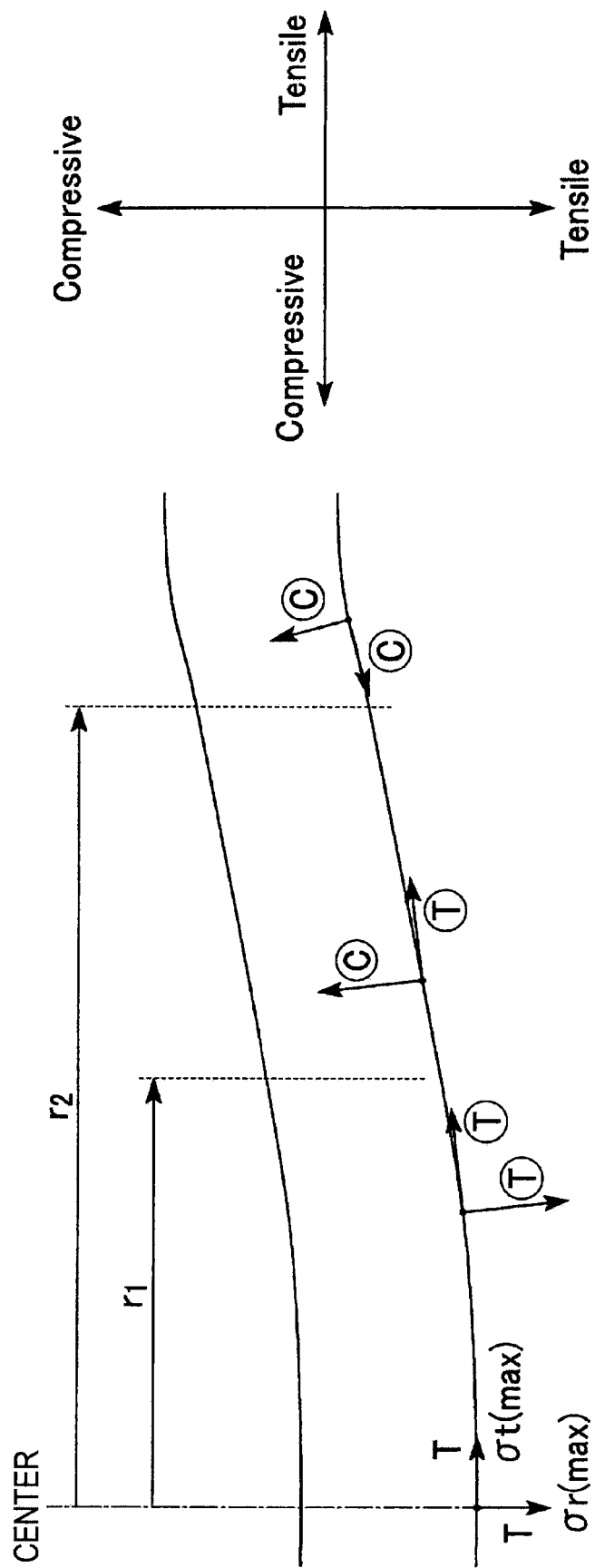
FIG. 9 is a schematic diagram for explaining relationships with a plurality of piezoelectric capacitances obtained by the pressure sensor device according to the present embodiment.

The state of the diaphragm 6 having the relationships described above can be illustrated as the graph shown in FIG. 8 and the schematic diagram shown in FIG. 9. In FIG. 9, the symbol (T) (encircled T) denotes "tensile," and the symbol (C) (encircled C) denotes "compressive." Further, the states of "tensile" and "compressive" switched to each other in accordance with the relationship between the distance r from the center of the diaphragm 6 and φ$_r$, φ$_t$ are expressed by the relationship shown in Table 1 shown below.

TABLE 1

|  | σ$_r$ | σ$_t$ |
|---|---|---|
| 0 < r < r$_1$ | Tensile | Tensile |
| r$_1$ < r < r$_2$ | Compressive | Tensile |
| r$_2$ < r | Compressive | Compressive |

Further, the symbols r$_1$, r$_2$ shown in FIGS. 8 and 9, and Table 1 are determined by multiplying r$_1$', r$_2$', which are obtained from the Poisson ratio v and the general expressions 8, 9 described below, by the radius of the sensing area A.

Expression 8

$$r_1' = \sqrt{\frac{1+v}{3+v}} \quad (8)$$

Expression 9

$$r_2' = \sqrt{\frac{1+v}{1+3v}} \quad (9)$$

On the other hand, in the case of applying the hexagonal wurtzite crystal material (class 6 mm) such as ZnO or AlN as the material of the piezoelectric film 4, the voltage change D (electric flux density) caused by the stress is expressed by the general expression 10 described below.

Expression 10

$$D = dT = \begin{bmatrix} 0 & 0 & 0 & 0 & d_{15} & 0 \\ 0 & 0 & 0 & d_{15} & 0 & 0 \\ d_{31} & d_{31} & d_{33} & 0 & 0 & 0 \end{bmatrix} \begin{bmatrix} T_1 \\ T_2 \\ T_3 \\ T_4 \\ T_5 \\ T_6 \end{bmatrix} \quad (10)$$

$$= \begin{bmatrix} d_{15}T_5 \\ d_{15}T_4 \\ d_{31}T_1 + d_{31}T_2 + d_{33}T_3 \end{bmatrix}$$

Here, the general expression 10 represents the case of assuming that the electric field pressure is equal to zero, and further, T1 and T2 correspond to φ$_r$, and T3 corresponds to −φ$_r$.

Figure 10A:
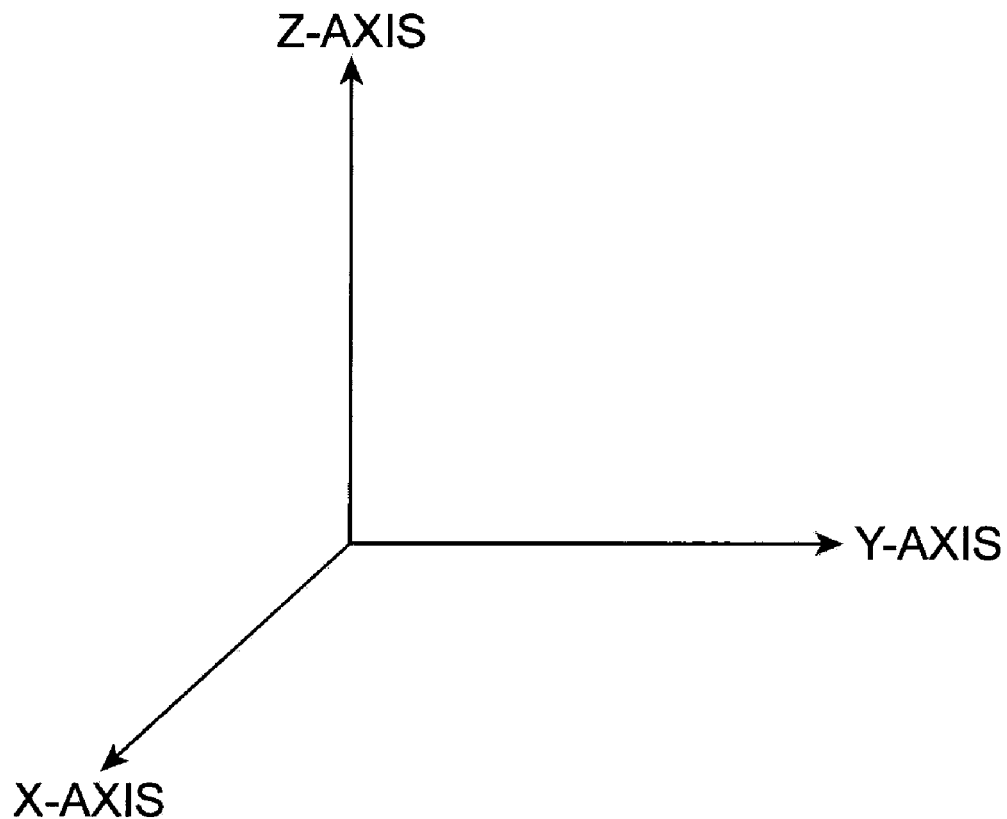
FIGS. 10A and 10B are schematic diagrams for explaining relationships with a plurality of piezoelectric capacitances obtained by the pressure sensor device according to the present embodiment.
Figure 10B:
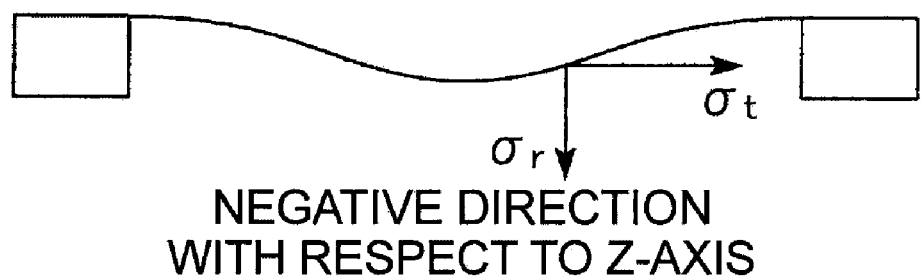

Here, since in the present embodiment, it is sufficient to capture only the electric flux density D$_3$ of the crystal axis Z out of the crystal axis directions in the schematic diagrams shown in FIGS. 10A and 10B, the relationship expressed by the general expression 11 described below is obtained.

Expression 11

$$D_3 = 2d_{31}\phi_r - d_{33}\phi_t \quad (11)$$

Here, in the case in which d$_{33}$>0 and d$_{31}$<0 are assumed in the general expression 11, the relationship between φ$_r$, φ$_t$, and D$_3$ and the distance r from the center of the thin film diaphragm becomes as shown in Table 2 described below. Further, in the case of in which d$_{33}$>0 and d$_{31}$>0 are assumed, the relationship becomes as shown in Table 3 described below. Here, the symbol d$_{31}$ denotes a voltage constant in the thickness direction (the direction in which the pressure is applied) of the upper electrode 52, and the symbol d$_{33}$ denotes a voltage constant in the radius r direction (the direction perpendicular to the direction in which the pressure is applied) of the upper electrode 52.

TABLE 2

|  | r < r$_1$ | r$_1$ < r < r$_2$ | r$_2$ < r |
|---|---|---|---|
| σ$_t$ | + | + | − |
| σ$_r$ | + | − | − |
| D$_3$ | − | −/+ | + |

TABLE 3

|  | r < r$_1$ | r$_1$ < r < r$_2$ | r$_2$ < r |
|---|---|---|---|
| σ$_t$ | + | + | − |
| σ$_r$ | + | − | − |
| D$_3$ | −/+ | + | −/+ |

Figure 11:
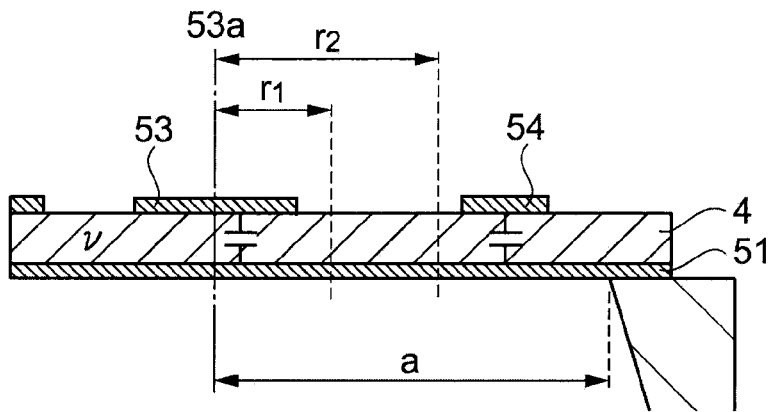
FIG. 11 is a schematic diagram for explaining relationships with a plurality of piezoelectric capacitances obtained by the pressure sensor device according to the present embodiment.

Therefore, in the case in which the material satisfying d$_{33}$>0 and d$_{31}$<0 such as AlN or ZnO described above is used for the piezoelectric film 4, the minute voltage change inside the piezoelectric film 4 can be detected, and thus, the pressure detection sensitivity can be improved if the center electrode 53 is formed within the range in which the distance from the center 53a is equal to or smaller than r$_1$, and the peripheral electrode 54 is formed within the range in which the distance from the center 53a is equal to or larger than r$_2$ as shown in FIG. 11.

In this case, the distance $r_3$ to the outer circumference 54b of the peripheral electrode 54 shown in FIG. 6B can be equal to or larger than the radius a of the diaphragm 6, the peripheral electrode 54 can be formed so as to extend to the outside of the sensing area A straddling the end of the sensing area A, or can be formed up to the outer circumference of the piezoelectric film 4.

Figure 12:
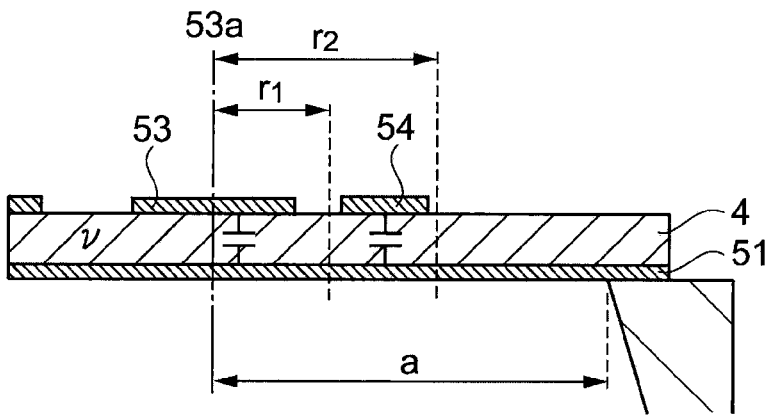
FIG. 12 is a schematic diagram for explaining relationships with a plurality of piezoelectric capacitances obtained by the pressure sensor device according to the present embodiment.

Further, in the case in which the material satisfying $d_{33}>0$ and $d_{31}>0$ such as $Li_2B_4O_7$ or $LiNbO_3$ is used for the piezoelectric film 4, the minute voltage change inside the piezoelectric film 4 can be detected, and thus, the pressure detection sensitivity can be improved if the center electrode 53 is formed within the range in which the distance from the center 53a is equal to or smaller than $r_1$, and the peripheral electrode 54 is formed within the range in which the distance from the center 53a is no smaller than $r_1$ and no larger than $r_2$ as shown in FIG. 12.

Figure 13:
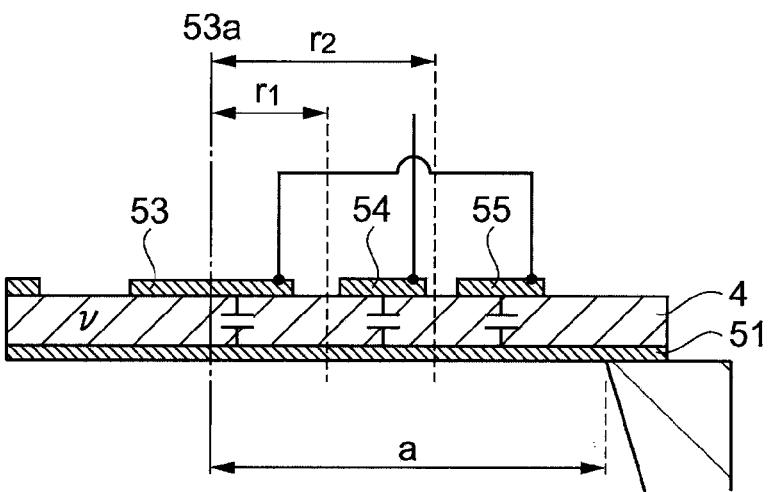
FIG. 13 is a schematic diagram for explaining relationships with a plurality of piezoelectric capacitances obtained by the pressure sensor device according to the present embodiment.

Further, it is also possible to adopt the configuration provided with a plurality of peripheral electrodes 54 as shown in FIG. 13, and in the example shown in the drawing, there are provided two peripheral electrodes 54, 55. In such a case, for example, the center electrode 53 is formed in the range in which the distance from the center 53a is within $r_1$, the peripheral electrode 54 outside thereof is formed in the range in which the distance from the center 53a is no smaller than $r_1$ and no larger than $r_2$, and the peripheral electrode 55 outside thereof is formed in the range in which the distance from the center 53a is equal to or larger than $r_2$. Thus, the minute voltage change inside the piezoelectric film 4 can be detected, and thus, the pressure detection sensitivity can be improved.

Here, although the explanation is presented using the pressure sensor device C having the substrate Sub1 partially removed in the sensing area A so as to be penetrated with reference to FIGS. 6A and 6B, the same can be applied to the pressure sensor device 1 having the first substrate a part of which is formed as a thin film, and provided with the lower electrode 51, piezoelectric film 4, the center electrode 53, and the peripheral electrode 54 stacked thereon as shown in FIGS. 1 and 5.

Here, in the case, for example, of providing the pressure sensor device G having a substrate Sub2 made of silicon with the lower electrode 51 formed thereon, the piezoelectric film 4 stacked on the lower electrode 51, and the center electrode 53 and the peripheral electrode 54 disposed on the piezoelectric film 4 as the upper electrode 52, the Poisson ratio can approximately be calculated using the general expression 12 described below.

Expression 12

$$v_{tot} = \frac{t_1 v_1 + t_2 v_2}{t_1 + t_2} \quad (12)$$

Here, in the general expression 12, the symbol $t_1$ denotes the thickness of the thin film section of the substrate Sub2, the symbol $t_2$ denotes the thickness of the piezoelectric film 4, $v_1$ denotes the Poisson ratio of the substrate Sub2, and the symbol $v_2$ denotes the Poisson ratio of the piezoelectric film 4.

Figure 14:
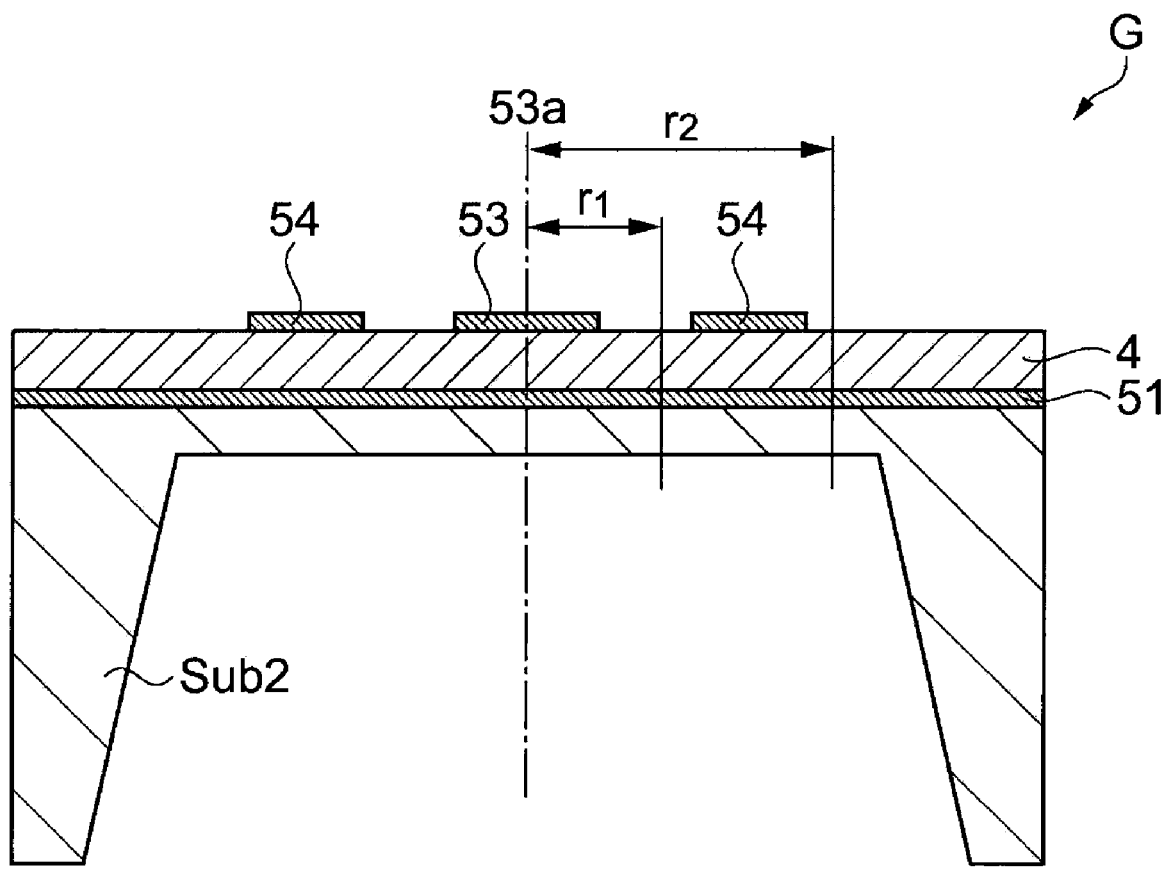
FIG. 14 is a schematic diagram for explaining relationships with a plurality of piezoelectric capacitances obtained by the pressure sensor device according to the present embodiment.
Figure 15A:
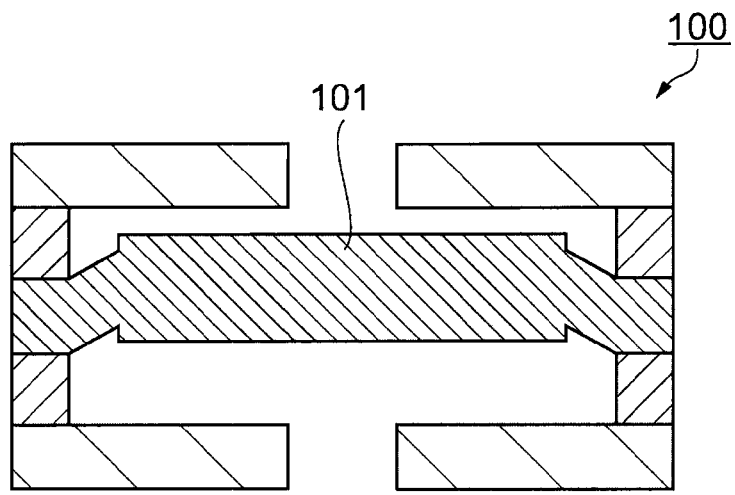
FIGS. 15A through 15C are schematic diagrams showing related art examples.
Figure 15B:
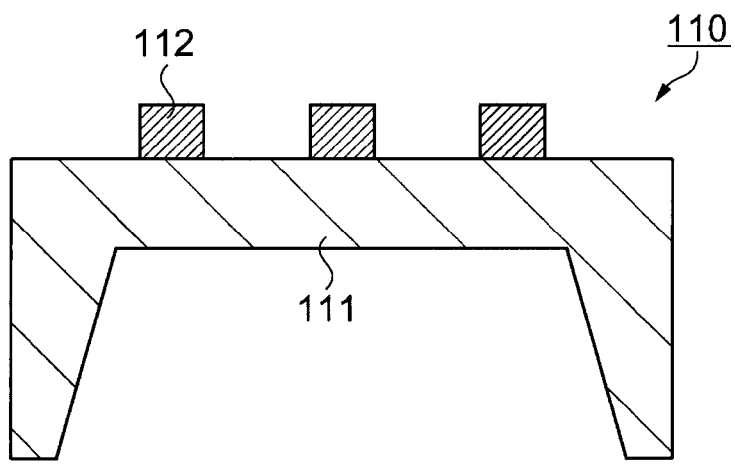
Figure 15C:
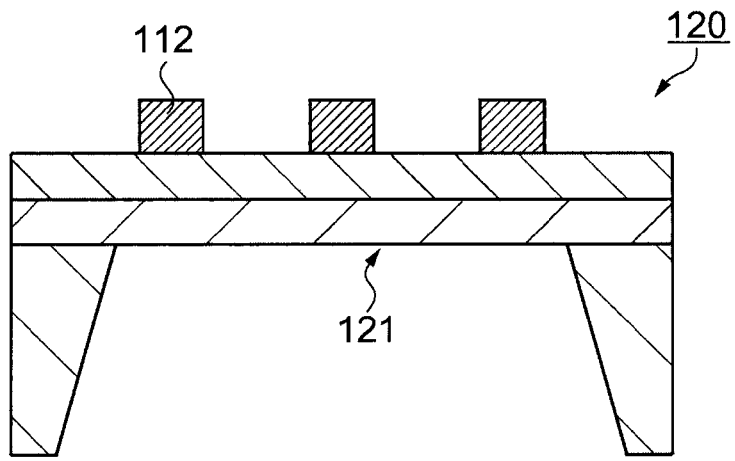

By using the general expression 12, it is possible to calculate the optimum values of the distances $r_1$, $r_2$ from the center of the center electrode 53 in the pressure sensor device G shown in FIG. 14.

Hereinafter, the distances $r_1$, $r_2$ in the case of using ZnO or AlN as the material of the piezoelectric film 4 in the pressure sensor device C of the example shown in the schematic diagrams of FIGS. 6A, 6B will be calculated based on actual physical property values shown in Table 4 described below.

TABLE 4

|  | ZnO | AlN |
|---|---|---|
| $d_{31}$ | −5.43 | −2.65 |
| $d_{33}$ | 11.67 | 5.53 |
| $d_{15}$ | −11.34 | −4.08 |
| v | 0.37 or lower | 0.27 or lower |

*Acoustic Wave Device Technology Handbook (p. 319)

In the case of using AlN as the piezoelectric film 4, according to the physical property values of $d_{31}$, $d_{33}$, $d_{15}$, and v shown in Table 4, the differences $r_1$, $r_2$ are determined by multiplying $r_1'$, $r_2'$, which are obtained by the general expressions 13, 14 described below, by the radius of the sensing area A.

Expression 13

$$r_1' = \sqrt{\frac{1+0.27}{3+0.27}} = 0.623 \quad (13)$$

Expression 14

$$r_2' = \sqrt{\frac{1+0.27}{1+0.81}} = 0.838 \quad (14)$$

Thus, in the case in which AlN is used as the piezoelectric film 4, and the radius of the sensing area A is set to be 100 μm, $r_1$ becomes about 62 μm, and $r_2$ becomes about 84 μm.

Further, in the case of using ZnO as the piezoelectric film 4, according to the physical property values of $d_{31}$, $d_{33}$, $d_{15}$, and v shown in Table 4, the differences $r_1$, $r_2$ are determined by multiplying $r_1'$, $r_2'$, which are obtained by the general expressions 15, 16 described below, by the radius of the sensing area A.

Expression 15

$$r_1' = \sqrt{\frac{1+0.37}{3+0.37}} = 0.638 \quad (15)$$

Expression 16

$$r_2' = \sqrt{\frac{1+0.37}{1+1.11}} = 0.806 \quad (16)$$

According to the general expressions 15, 16, since each of the distances $r_1$, $r_2$ is similar between the case of using AlN as the material of the piezoelectric film 4 and the case of using ZnO, it is understood that the center electrode 53 and the peripheral electrode 54 can be disposed in substantially the same dimensional relationship in both cases.

The pressure sensor device according to the present embodiment is capable of detecting a minute voltage change caused inside the piezoelectric film 4 along the principle explained using the general expressions, and becomes superior in pressure detection sensitivity.

According to the pressure sensor device of the present embodiment explained hereinabove, since the pressure sensor device is provided with the first substrate 21, the buried oxide film 3 stacked on the first substrate 21, and the second substrate 22 stacked on the buried oxide film 3, wherein the piezoelectric film 4 and the electrode 5 are formed on the second substrate 22 in a stacked manner, at least a part of the first substrate 21 corresponding to the area where the piezoelectric film 4 and the electrode 5 are disposed on the second substrate 22 is removed, the electrode 5 is composed mainly of the lower electrode 51 formed on the second substrate 22 and the upper electrode 52 formed on the piezoelectric film 4 stacked on the lower electrode 51, and the upper electrode 52 is mainly composed of the center electrode 53 and the peripheral electrode 54, it is possible to realize the pressure sensor device capable of performing detection based on a plurality of piezoelectric capacitances, low power consumption, with superior pressure detection sensibility, and easily formed integrally with a semiconductor circuit.

Hereinafter, the semiconductor device according to the present embodiment will be explained with reference to FIGS. 4A and 4B.

The semiconductor 30 of the present embodiment is provided with the first substrate 21, the buried oxide film 3 (the buried insulating film), and the second substrate 22. Further, the piezoelectric film 4 and the electrode 5 are formed so as to be stacked on the second substrate 22. On the second substrate 22, there is provided the sensing area A obtained by removing at least a part of the first substrate 21 corresponding to the area where the piezoelectric film 4 and the electrode 5 are disposed. The first section corresponding to the area where the first substrate 21 remains surrounds the circular second section corresponding to the area where the first substrate 21 is removed. The electrode 5 is composed of the lower electrode 51 formed on the second substrate 22 and the upper electrode 52 formed on the piezoelectric film 4 stacked on the lower electrode 51. The upper electrode 52 is composed of at least two parts. The detection circuit 9 (the CMOS circuit) using the differential amplifier circuit electrically connected to the respective parts of the electrode 5 for detecting the pressure applied to the piezoelectric film 4 to output the pressure detection signal is formed on the buried oxide film 3. In this way, the semiconductor device 30 is roughly configured.

Further, the semiconductor device 30 of the example shown in the drawing has the upper electrode 52 composed of the center electrode 53 disposed at substantially the center of the surface of the piezoelectric film 4, and the peripheral electrode 54 disposed apart from the center electrode 53 and formed to have a ring-like shape so as to surround the center electrode 53.

As described above, in the semiconductor device 30, the piezoelectric film 4 and the electrode 5 are disposed on the second substrate 22, the first substrate 21 is partially removed at least at a part of the first substrate 21 corresponding to the area where the piezoelectric film 4 and the electrode 5, namely in the position corresponding to the entire piezoelectric film 4 and the second substrate 22, and the part is formed as the thin film diaphragm 6 composed mainly of the buried oxide film 3 and the second substrate 22, thereby forming the configuration including the sensing area A substantially the same as the pressure sensor device 1 described above.

Further, in the sensing area A provided to the semiconductor device 30, each of the first substrate 21, the second substrate 22, the buried oxide film 3, the piezoelectric film 4, and the electrode 5 forming the sensing area A can be obtained using substantially the same material and substantially the same method as in the pressure sensor device 1 according to the present embodiment described above.

Further, in the semiconductor device 30, the detection circuit 9 (the differential amplifier circuit) is disposed on the buried oxide film 3. The detection circuit 9 incorporates a circuit substantially the same as the detection circuit 9 exemplified in FIGS. 2A and 2B, and is electrically connected to the electrodes via wiring sections not shown.

Further, in the semiconductor device 30, the covering layer 8 made of silicon oxide or silicon nitride, which is omitted from the drawing in FIG. 4, is formed on the surface of the buried oxide film 3 as shown in FIG. 1 except the area where the detection circuit 9, the second substrate 22, and various layers thereon are disposed.

According to the semiconductor device 30 of the present embodiment, since there is provided the sensing area A having a configuration in which the piezoelectric film 4 and the electrode 5 are formed on the second substrate 22 in a stacked manner, at least a part of the first substrate 21 corresponding to the area where the piezoelectric film 4 and the electrode 5 are disposed on the second substrate 22 is removed, and the electrode 5 is composed of the lower electrode 51 formed on the second substrate 22 and the center electrode 53 and the peripheral electrode 54 formed on the piezoelectric film 4 on the lower electrode 51, the change in voltage in the piezoelectric film 4 can be detected based on the two different piezoelectric capacitances, thereby achieving low power consumption and superior pressure detection sensitivity.

It should be noted that although the semiconductor device 30 shown in FIGS. 4A and 4B has the configuration in which only the first substrate 21 is removed by etching in the area where the piezoelectric film 4 and the lower electrode 51 are disposed, the invention is not limited to this configuration. For example, it is possible to adopt the configuration in which at least a part of the buried oxide film 3 and the second substrate 22 is removed in the area where the piezoelectric film 4 and the lower electrode 51 is disposed.

Further, although in the semiconductor device 30, there is provided the configuration in which the ring-like peripheral electrode 54 is disposed at one place on the piezoelectric film 4 so as to surround the center electrode 53, the invention is not limited to this configuration, but the configuration in which a plurality of peripheral electrodes 54 is disposed so as to surround the center electrode 53, for example, can also be adopted.

Therefore, according to the present embodiment, the change in electric field caused inside the piezoelectric film 4 in response to the piezoelectric film 4 being distorted by the pressure P applied to the piezoelectric film 4 can be obtained as an amplified signal of the difference in voltage by the detection circuit 9 (the differential amplifier circuit) for detecting the respective changes in voltages inside the piezoelectric film 4 based on a plurality of piezoelectric capacitances, namely the piezoelectric capacitance between the center electrode 53 and the lower electrode 51 and the piezoelectric capacitance between the peripheral electrode 54 and the lower electrode 51. Therefore, it is possible to subtract the unnecessary noise included in the change in voltage caused by the distortion of the piezoelectric film 4 and the noise such as the variation of the power supply voltage (the drain power supply voltage) $V_{dd}$ to balance them out, thus the pressure P applied to the piezoelectric film 4 can be detected with high sensitivity without being affected by such noises.

According to this configuration, even in the case in which only minute changes occur in voltages inside the piezoelectric film 4 based on the piezoelectric capacitance between the center electrode 53 and the lower electrode 51 and the piezoelectric capacitance between the peripheral electrode 54 and the lower electrode 51 due to the distortion of the piezoelectric film 4 in response to the pressure P applied to the piezoelectric film 4, since the polarity of the charge generated is different between the center electrode 53 and the peripheral electrode 54, it is possible to increase the differential output voltage. Further, by connecting the differential output electrodes composed of the center electrode 53 and the peripheral electrode 54 to the detection circuit 9 having the differential circuit, the pressure sensor, which has high detection sensitivity, which is not affected by the noises similarly to the case described above, and which is highly sensitive, can be realized.

According to this configuration, even in the case in which only minute changes occur in voltages inside the piezoelectric film 4 based on the piezoelectric capacitance between the center electrode 53 and the lower electrode 51 and the piezoelectric capacitance between the peripheral electrode 54 and the lower electrode 51 due to the distortion of the piezoelectric film 4 in response to the pressure P applied to the piezoelectric film 4, since one (e.g., the center electrode 53) of the center electrode 53 and the peripheral electrode 54 is disposed in the area where the electric flux density $D_3$ is negative, and the other (e.g., the peripheral electrode 54) of the center electrode 53 and the peripheral electrode 54 is disposed in the area where the electric flux density $D_3$ is positive, the polarity of the charge generated is different between the center electrode 53 and the peripheral electrode 54, and thus the differential output voltage can be increased. Further, by connecting the differential output electrodes composed of the center electrode 53 and the peripheral electrode 54 to the detection circuit 9 having the differential circuit, the pressure sensor, which has high detection sensitivity, which is not affected by the noises similarly to the case described above, and which is highly sensitive, can be realized.

According to this configuration, since the voltage level input to the detector (the detection circuit 9) such as the differential amplifier circuit can be controlled using the reference voltage $V_{ref}$, the performance (such as a gain) of the detector (the detection circuit 9) can be set to be the optimum value. Therefore, the change in voltage inside the piezoelectric film 4 can be detected, and in particular, with high sensitivity.

According to this configuration, since a larger amount of charge is generated at the boundary (the boundary between the first section and the second section) in the periphery of the diaphragm 6 where the compressive stress and the tensile stress are concentrated inside the piezoelectric film 4 in response to the piezoelectric film 4 being distorted due to the pressure P applied to the piezoelectric film 4, the pressure applied to the piezoelectric film 4 can efficiently be detected.

According to this configuration, the detection circuit 9 formed of the semiconductor material can be formed on the thick portion of the substrate 2, and thus the semiconductor device 30 integrating the sensing area A (the second section) and the detection circuit 9 with each other can be provided.

According to this configuration, the detection circuit 9 can be formed on the first section in the same semiconductor substrate, and thus, the integrated pressure sensor device 1 having the second section formed as the sensing area A can be provided.

It should be noted that modifications, improvements, and so on within the range where at least a part of problems described above can be solved can be included in the embodiment described above.

For example, although the substrate 2 having the SOI structure is used, the present embodiment is not limited to this configuration, but a substrate obtained by forming a thermally oxidized film on the silicon substrate, and further forming a polysilicon layer thereon to have a thickness of several μm can also be used.

Further, although in the embodiment described above the semiconductor device is explained exemplifying the pressure sensor device, the semiconductor device is not limited thereto, but can be applied to a stress sensor, an MEMS microphone (a high-sensitivity pressure sensor), an acceleration sensor, and so on.

The entire disclosure of Japanese Patent Application No. 2008-280959, filed Oct. 31, 2008 is expressly incorporated by reference herein.

What is claimed is:

1. A pressure sensor device, comprising:
a substrate having a first section and a second section being adjacent to the first section and thinner than the first section;
a piezoelectric film having flexibility and disposed on the second section;
an upper electrode formed on the piezoelectric film and including:
a center electrode disposed at a substantially center of the second section in plan view; and
a peripheral electrode disposed apart from the center electrode so as to surround the center electrode;
a lower electrode formed between the second section and the piezoelectric film and disposed so as to face the upper electrode; and
a detection circuit including a differential circuit electrically connected to the center electrode and the peripheral electrode,
wherein the detection circuit detects a difference between a first voltage caused between the center electrode and the lower electrode in response to the piezoelectric film being distorted, and a second voltage caused between the peripheral electrode and the lower electrode in response to the piezoelectric film being distorted, and
a first polarity of a first charge generated in the center electrode in response to the piezoelectric film being distorted is different from a second polarity of a second charge generated in the peripheral electrode in response to the piezoelectric film being distorted.

2. The pressure sensor device according to claim 1, wherein
one of the center electrode and the peripheral electrode is disposed in a first area where a first electric flux density caused in response to the piezoelectric film being distorted is negative, and
the other of the center electrode and the peripheral electrode is disposed in a second area where a second electric flux density caused in response to the piezoelectric film being distorted is positive.

3. The pressure sensor device according to claim 1, wherein a reference voltage is applied to the lower electrode.

4. The pressure sensor device according to claim 1, wherein
the piezoelectric film and the peripheral electrode are disposed so as to straddle a boundary between the first section and the second section.

5. The pressure sensor device according to claim 1, wherein
the substrate is made of a semiconductor material.

6. The pressure sensor device according to claim 5, wherein
the detection circuit is formed on the substrate.

7. The pressure sensor device according to claim 1, wherein
the first section surrounds the second section in plan view.

8. The pressure sensor device according to claim 7, wherein
the second section has a circular shape in plan view.

* * * * *